United States Patent [19]

Skibinski

[11] Patent Number: 4,984,644
[45] Date of Patent: * Jan. 15, 1991

[54] OVERHEAD LEVER TORQUE SUSPENSION WEIGHING SCALE

[75] Inventor: Robert E. Skibinski, Tompkinsville, Ky.

[73] Assignee: Mid-America Scale, Inc., Tompkinsville, Ky.

[ * ] Notice: The portion of the term of this patent subsequent to Apr. 18, 2006 has been disclaimed.

[21] Appl. No.: 372,563

[22] Filed: Jun. 28, 1989

Related U.S. Application Data

[63] Continuation-in-part of Ser. No. 298,915, Jan. 19, 1989.

[51] Int. Cl.⁵ .............................................. G01G 19/52
[52] U.S. Cl. ................................. 177/132; 177/DIG. 9
[58] Field of Search ................... 177/132, 136, DIG. 9

[56] References Cited

U.S. PATENT DOCUMENTS

| | | | |
|---|---|---|---|
| 2,736,549 | 2/1956 | Paul | 177/DIG. 9 |
| 3,512,595 | 5/1970 | Laimins . | |
| 4,023,634 | 5/1977 | Provi et al. | 177/DIG. 9 |
| 4,050,532 | 9/1977 | Provi et al. | 177/256 |
| 4,138,968 | 2/1979 | Ostermann | 177/133 X |
| 4,241,801 | 12/1980 | Kushmuk | 177/DIG. 9 |
| 4,427,083 | 1/1984 | Muddle . | |
| 4,533,008 | 8/1985 | Osterman . | |
| 4,569,408 | 2/1986 | Berns et al. . | |
| 4,601,356 | 7/1986 | Muccillo, Jr. . | |
| 4,821,823 | 4/1989 | Skibinski | 177/DIG. 9 |

Primary Examiner—George H. Miller, Jr.

[57] ABSTRACT

A torque suspension weighing scale includes a weighbridge/animal crate, a main frame and torque suspension members all integrally combined by unique ball and seat retention assemblies fitted within keyhold formations formed in each of the subframe and weighing platform.

12 Claims, 6 Drawing Sheets

OVERHEAD LEVER TORQUE SUSPENSION WEIGHING SCALE

This is a Continuation-In-Part of application Ser. No. 07/298,915 filed on Jan. 19, 1989.

BACKGROUND OF THE INVENTION

1. Field of the Invention

The present invention relates to a torque suspension weighing scale, including a mainframe, torque tubes, and a weighbridge/animal crate serving the dual purpose of 1) a weighbridge and 2) to confine animals during the weighing process whereby the weighbridge/animal crate is close to the ground to enable weighing of small animals. More specifically, the present invention relates to a torque suspension weighing scale having an improved arrangement for securing torque tubes to a lever system above a weighing platform which imparts greater sensitivity to the scale by preventing lateral displacement of a ball and seat retention assembly with respect to the mainframe and weighbridge/animal crate when force is applied to the weighbridge/animal crate for weighing purposes.

2. Description of Related Art

Heretofore, torque suspension weighing scales have typically been found in livestock scale applications. These scales primarily utilize cable assemblies which are less flexible than is desirable to provide good self alignment between a subframe and weighing platform. In addition, the method of retaining the ends of the cable was to drill a hole in a mating steel structure, hook the end of the cable through the hole, and stake on a retaining collar, which induces further misalignment into the non-flexible cable, thereby resulting in a scale with very little sensitivity. Other manufacturers have previously used commonly accepted pivot and bearing methods which usually work well but are costly to produce.

Accordingly, a need in the art exists for a torque suspension weighing scale which has tolerance and sensitivity requirements conforming to those set forth by the National Bureau of Standards for a "legal-for-trade" scale. Additionally, it has become necessary in the art to develop a scale which is accurate and stable over a wide variety of uses or particular animal sizes if used as a livestock weighing scale and which imparts greater sensitivity to the scale. It is necessary to prevent lateral displacement of the anchoring device for the weigh cables with respect to the subframe and the platform when force is applied to the platform in a weighing operation. Finally, it is necessary to provide a livestock weighing scale which is low to the ground and easily accessible to small animals such as hogs and sheep.

It should be noted that it is very difficult to make small animals such as hogs and sheep or the like enter a "blind" container. (One that they cannot see through). Unlike other scales for weighing these type of animals. This weighbridge/animal crate is designed as a see-through unit.

SUMMARY OF THE INVENTION

Accordingly, it is a primary object of the present invention to provide a torque suspension weighing scale having a mainframe, weighbridge/animal crate, and torque tubes which provides greater sensitivity for weighing purposes.

The object of the present invention is fulfilled by providing a torque suspensing weighing scale comprising:

An apparatus for securely fastening torque suspension members to a main frame and a weighbridge/animal crate in a torque suspension weighing scale comprising:

weigh cable means separately surrounding said torque suspension member at a predetermined location thereof;

a ball member fixed to each exposed end of said weigh cable means;

a plurality of seat retention members axially movable along said weigh cable means and corresponding to each said ball member; and means for supporting said ball and seat members in said predetermined locations of said weigh cable means;

wherein said ball member fits within said seat retention member with respect to each said weighbridge/animal crate and said main frame on said means for supporting when torque is applied to said torque suspension member in response to force applied to said weighbridge/animal crate.

The torque suspension members are connected to both the mainframe and the weighbridge/animal crate with a weigh cable threaded through convolutions in the outer surface of the torque suspension member. A ball is fixed to the exposed ends of the weigh cable, a seat retention system is slidable along the axial surface of each end of the weigh cable, a keyhole slot is formed in a short end of each of the inverted L shaped uprights and L shaped legs depending from the weighbridge/animal crate, wherein weight applied to this member will force the depending legs downward causing the balls to fit securely within the seat retention system inserted into the keyhole slots.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention and wherein.

Figure 2:
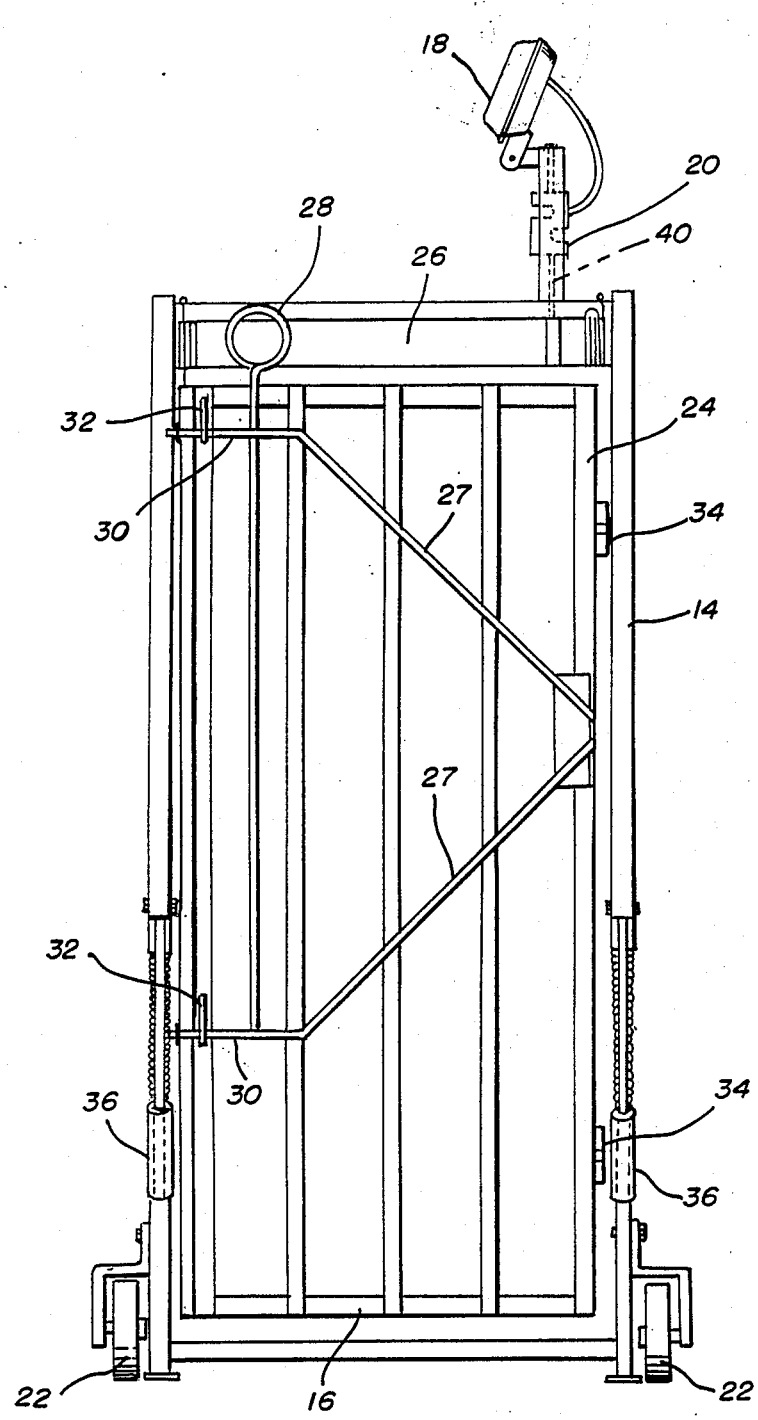
Figure 3:
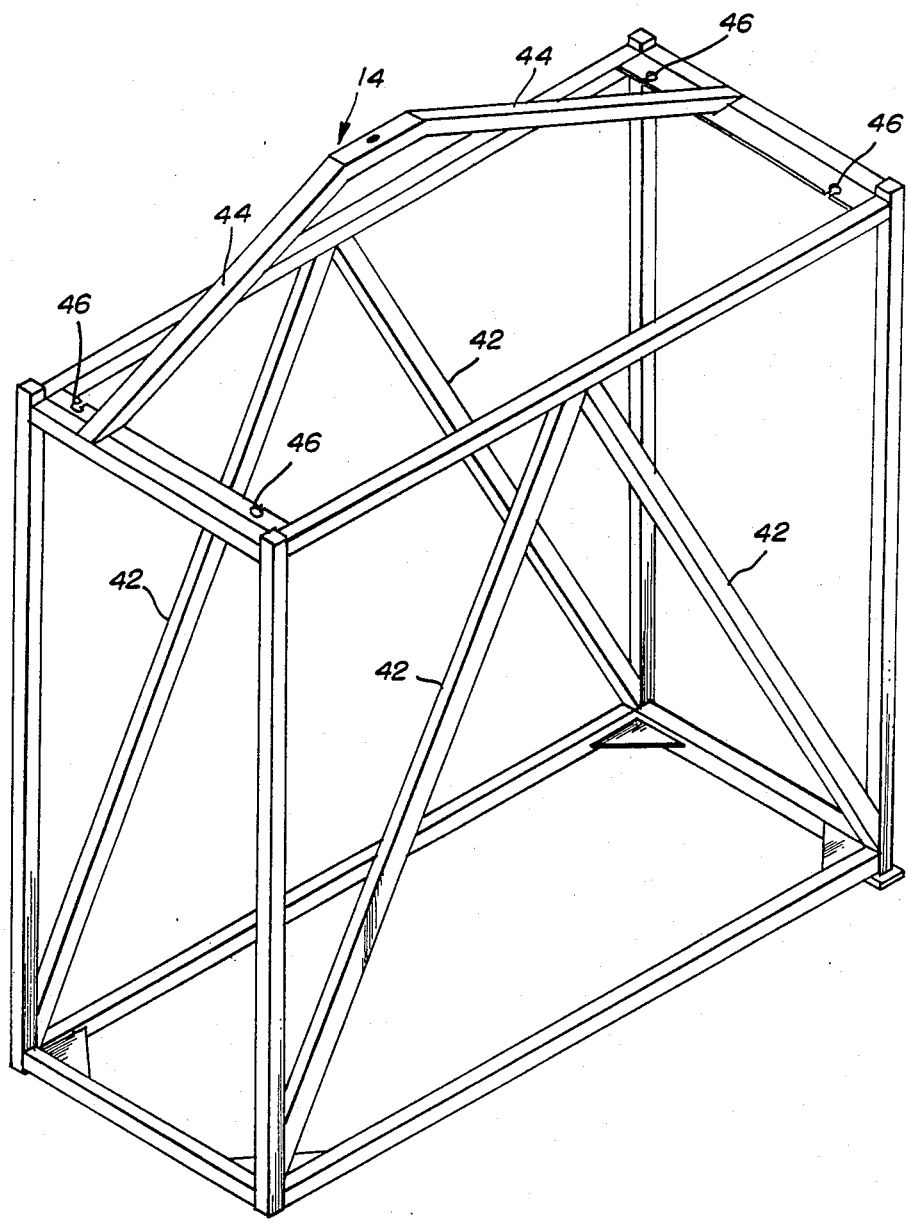
Figure 4:
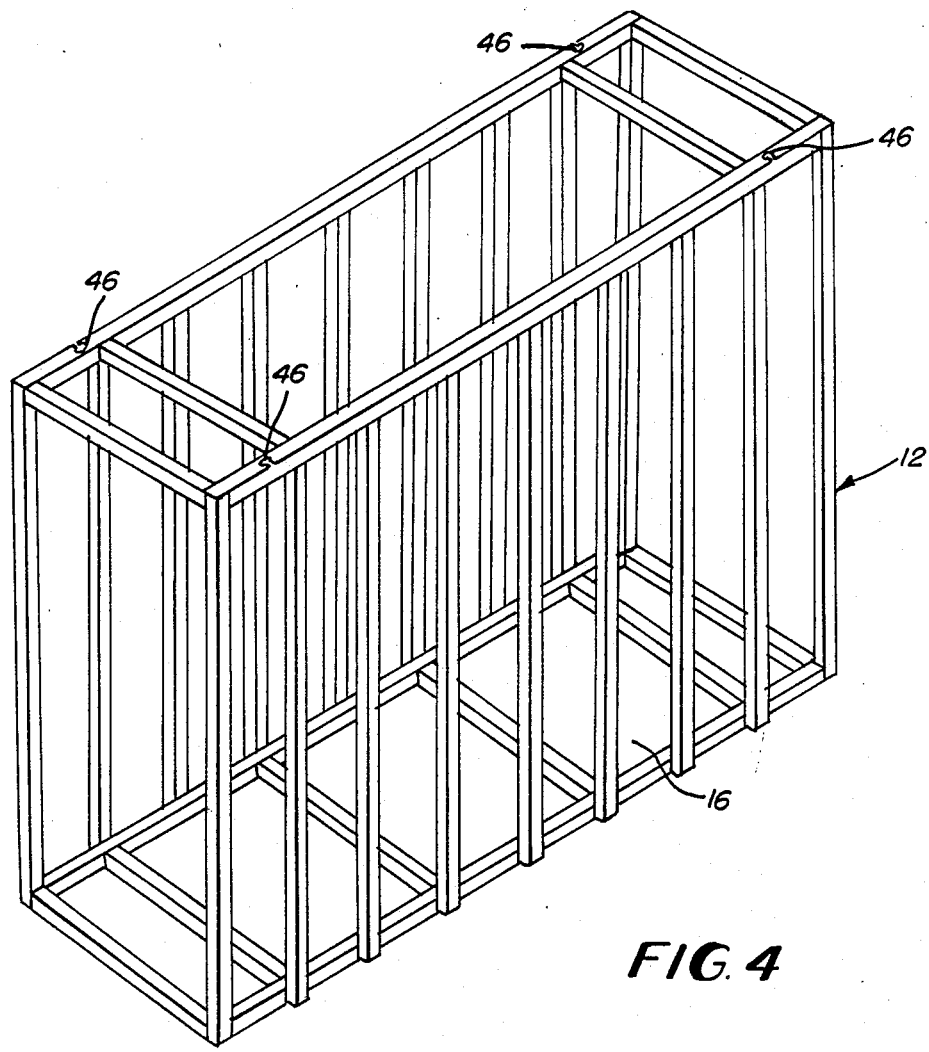
Figure 5:
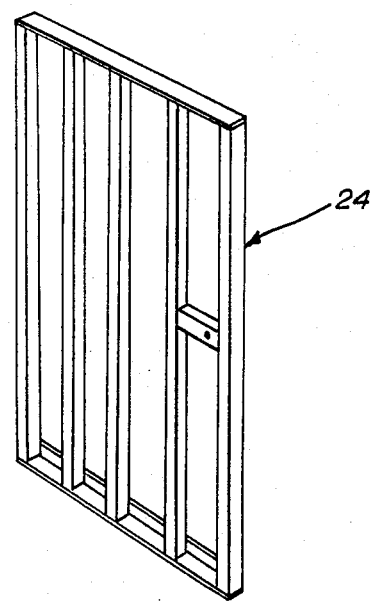
Figure 6:
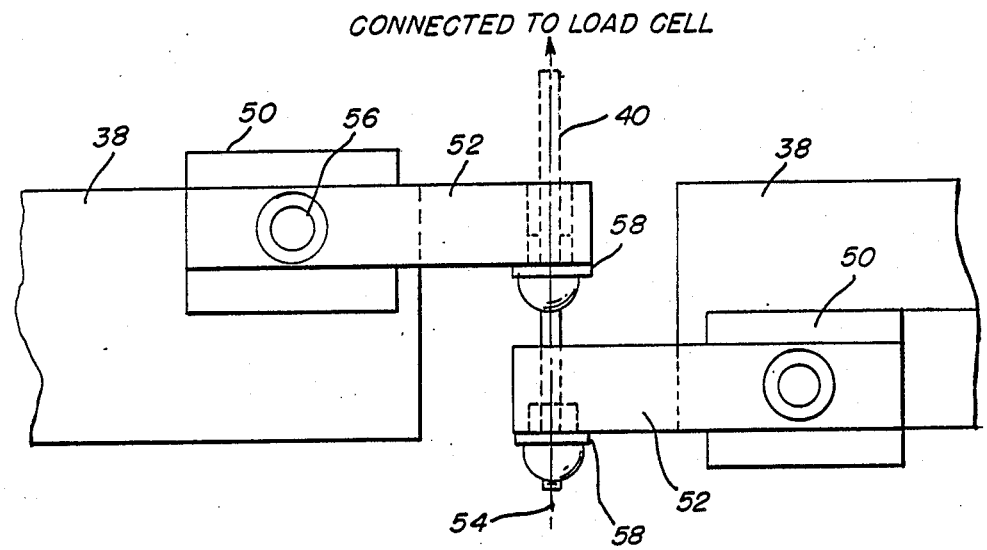
Figure 7:
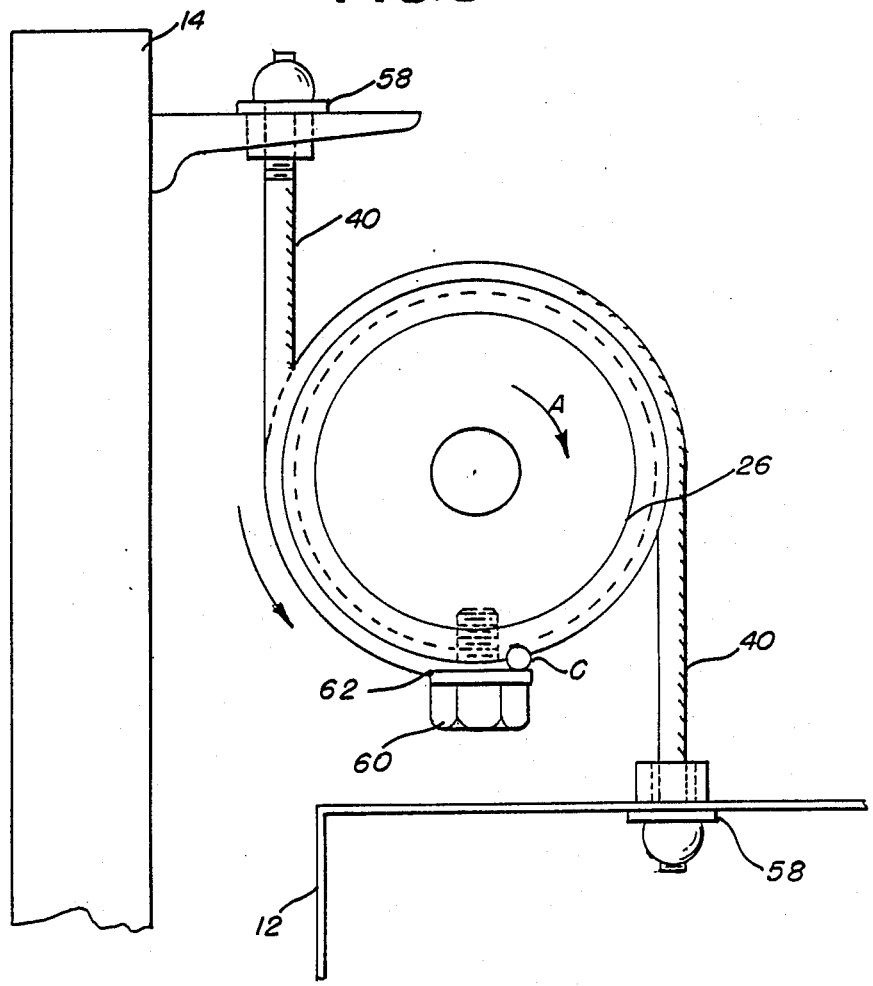
Figure 8:
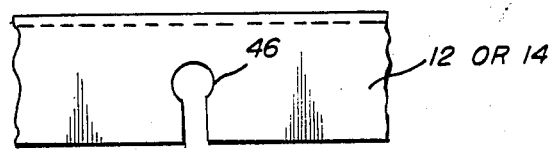
Figure 9:
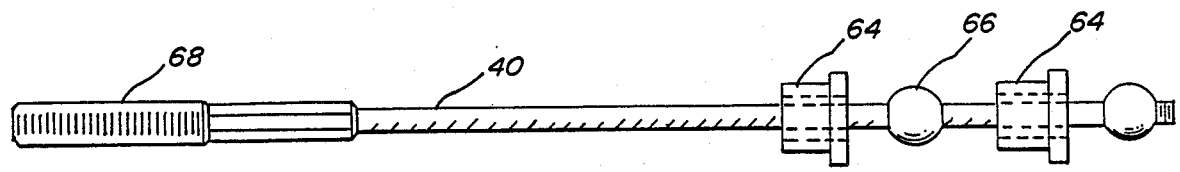
Figure 10:
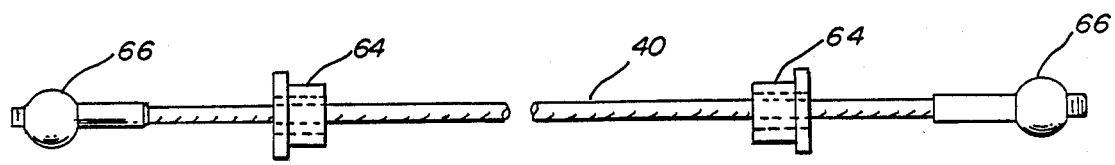
Figure 11:
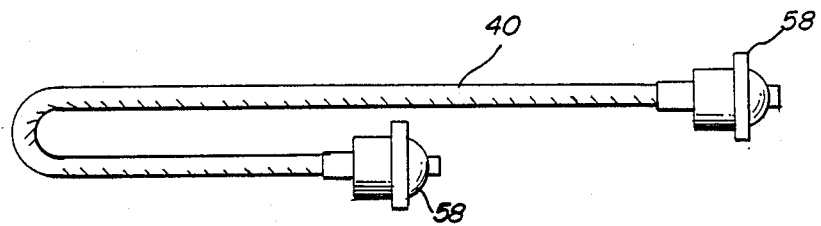

The illustration depicts use of an electronic digital weight indicator, which is used in conjuction with an electronic load cell. However, a mechanical weigh beam, or either a hydraulic indicator or electronic indicator with a pressure transducer or a mechanical dial indicator could also be used with this scale configuration;

FIG. 2 is an end view of the weighing scale of the present invention;

FIG. 3 is a perspective view of the weighing scale main-frame which supports the weighbridge/animal crate;

FIG. 4 is a perspective view of the weighing scale weighbridge or animal crate;

FIG. 5 is a perspective view of a gate for use with the weighing scale subframe;

FIG. 6 is a cross-sectional view showing the connection of lever arms to a secondary retention assembly of the present invention;

FIG. 7 is a cross sectional view of a primary retention assembly for connecting the subframe to the main frame in the present invention;

FIG. 8 is a top partial view of a keyhole slot formed within an L--shaped extension member of each of the main frame and subframe;

FIG. 9 is a cross sectional view of ball and seat fittings for a secondary weigh cable as used in FIG. 6;

FIG. 10 is a cross sectional view of ball and seat fittings for a primary weigh cable as sued in FIG. 7; and FIG. 11 is a cross sectional view of ball and seat fittings in an assembled portion.

DETAILED DESCRIPTION OF PREFERRED EMBODIMENTS

Figure 1:
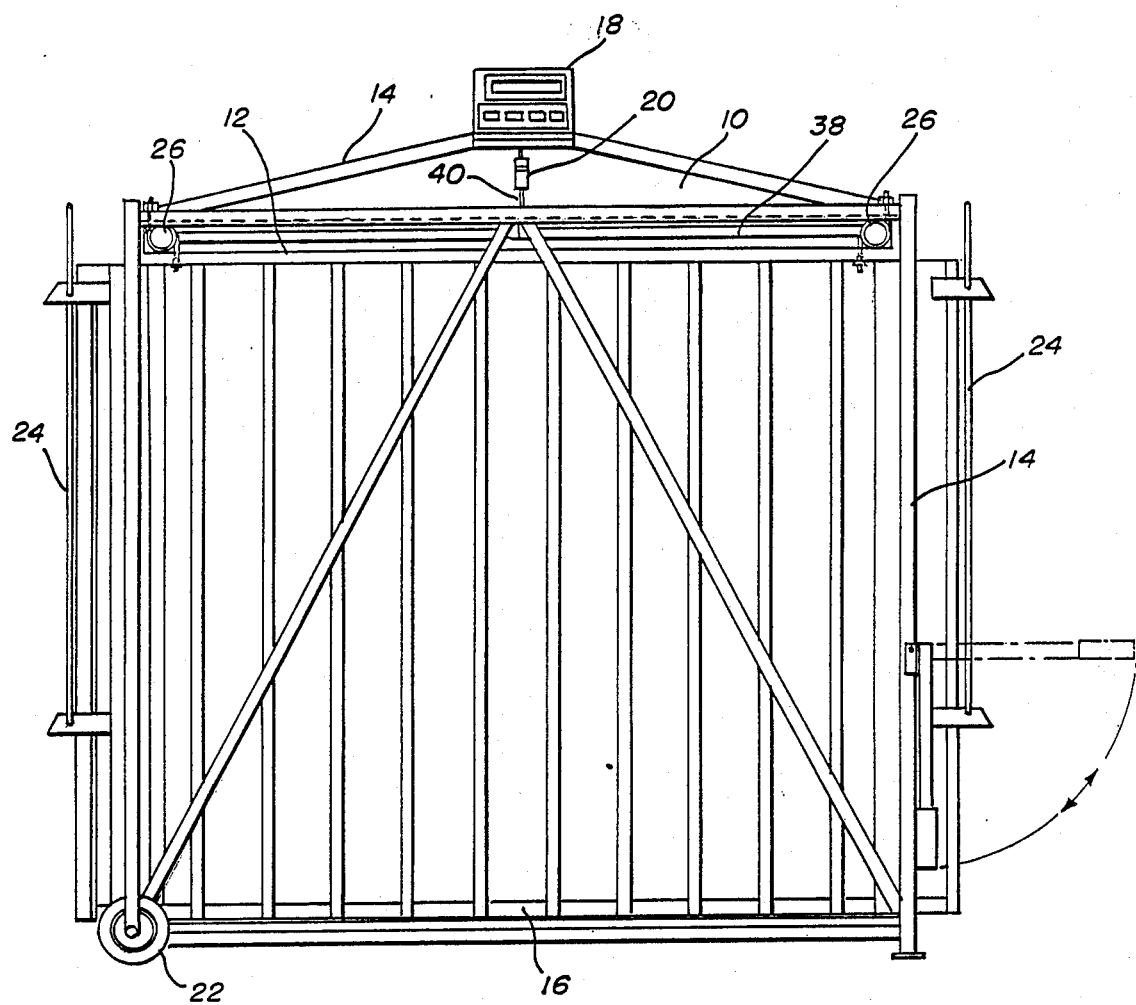
FIG. 1 is a perspective view of a torque suspension weighing scale as employed in a livestock type scale.

Referring to FIG. 1, there is generally shown a livestock scale 10 of a four sided construction having at least a weighbridge/animal crate 12 and a main frame 14. A platform 16 is incorporated integrally with the weighbridge/animal crate 12. Further, a weigh indicator 18 is provided in conjunction with an electronic load cell 20 (see FIG. 2) which transfers force introduced into the load cell into an electric signal used by indicator 18.

The livestock scale can also be provided with wheels 22 at one end of the livestock scale to enable easy movement thereof between weighing locations. Gates 24 are provided at each end of the livestock weighing scale to enable entrance and exit of the livestock as well as a means for containing livestock within the apparatus for weighing purposes. At 26 are shown two torque tubes positioned between upper lateral end portions of weighbridge/animal crate 12 and corresponding upper lateral end portions of main frame 14.

FIG. 2 is an end view of the weighing scale of the present invention showing the relative position of a torque tube 26 within the weighing scale 10, and includes the door member 24 of weighbridge/animal crate 2, main frame 14, the weigh indicator 18 and its corresponding load cell 20. The gate 24 may include cross-bars 27 or the like connected to a handle member 28 whereby the handle member 28, when gripped, may be pulled up or pushed down in a vertical direction to engage or disengage cross-bar extensions 30 with slots 32 formed on the weighbridge/animal crate 12. The gate 24 will pivot about hinge members 34 for access to the interior of the weighing scale weighbridge/animal crate 12.

Also provided on the main frame 14 are multi-purpose grips 36 for retractable handles, the handles being for the purpose of transporting the scale in a wheelbarrow fashion.

Connection of the torque tube 26 to each of the weighbridge/animal crate 12 and main frame 14 will be described in connection with FIG. 7.

Attached to each torque tube 26 is a lever arm 38 (shown in FIG. 6) extending perpendicular to the torque tube and terminating at a location beneath load cell 20 and connected thereto by a secondary weigh cable 40 as more clearly shown in FIGS. 2 and 6. Thus, the two lever arms 38 meet at and are joined by the secondary weigh cable 40 as shown in FIG. 6.

FIG. 3 is a perspective view of the main frame 14 of the weighing scale 10 and is primarily contructed in a rectangular box-like shape of square carbon steel tubing and includes support bars 42 at the front and rear thereof to lend structural support to the main frame structure.

An indicator mount 44 is provided above the main frame 14 to enable easy reading of the weigh indicator 18 in its mounted position. Keyhole slots 46 are formed within the upper portion of the main frame 14 in pairs at opposing lateral ends as shown. The function of these keyhole slots will be more fully described in connection with the ball and seat
retention assembly of FIGS. 6-8.

FIG. 4 is a perspective view of the weighing scale weighbridge/animal crate 12. Once again, the weighbridge/animal crate 12 is substantially rectangular-shaped so as to suspendedly fit within the main frame 14. The weighbridge/animal crate has a substantially open top end so as to enable a livestock handler to have easy access to small animals being weighed therein. Although not shown, a fixed platform 48 is provided at the base thereof for supporting small livestock during a weighing operation.

Keyhole slots 46 are formed within the upper portion of the weighbridge/animal crate 12 in pairs at opposing parallel ends as shown.

FIG. 5 shows a perspective view of the gate 24 for use with the weighbridge/animal crate 12, its location with respect to the remaining weighbridge/animal crate being most clearly shown in FIGS. 1 and 2.

FIG. 6 shows details of a secondary retention assembly having adjoining lever arms 38, blocks 50 attached to an upper portion of one lever arm and a lower portion of the opposing lever arm, and adjustable nose irons 52 attached to arms 38 and overlapping at center line 54. The adjustable nose irons are fixed to the lever arms 38 by means of a bolt 56. A ball and seat retention assembly 58 is provided to be positioned on the under side of both nose irons 52, their manner of connection to be described in FIGS. 9-11. A weigh cable 40 extends from the lowest ball and seat retention member 58 along the center line 54 up to the load cell 22 which is electrically connected to the weigh indicator 18 shown in FIG. 1. The cable 40 used as the weigh cable of the present invention is made of a 7×19 stainless steel strand core cable, which is strong yet flexible enough for good self alignment. The cable utilized in the present device enhances scale sensitivity, while being at the same time an economical choice. The load applied to the weighbridge/animal crate 12 translates to a reduction of 11.105 in the large version and 9.421 in the small version to the amount applied to the scale. For instance, if a three hundred pound animal were applied to the scale, the reduction factor of 11.105 would result in only 27.015 pounds being applied to the nose iron 52 at the center line 54 for indication on the weigh indicator 18.

FIG. 7 shows the primary retention assembly with the connection between the weighbridge/animal crate 12 and the main frame 14 via the torque tube 26. In particular, the ball and seat retention assembly 58 is supported at the main frame 14 and the weighbridge/animal crate 12 by means of a keyhole slot 46 (shown in FIG. 8). The cylindrical torque member 26 is of a specific diameter on the order of two inches or a 2 inch diameter schedule 80 pipe to work in combination with the weigh cable 40 to more accurately measure weight. Convolutions are provided in the exterior surface of the torque member 26 to secure the weigh cable 40 and prevent slippage during a weighing operation and also to provide dimensional accuracy of plus or minus one one thousandth of an inch (±0.001") in the diameter of the torque tubes which would be impossible if the tubes were not convoluted. Cable 40 depends from the upper main frame 14 to circumscribe the torque tube 26 for one quarter revolution and is wrapped around the shank of bolt 60 toward the observer at location C to be reverse wrapped around the torque tube in the direction A and depend down toward subframe 12 and fitted into another ball and seat retention assembly 58 formed therein. When force is applied to the weighbridge/animal crate 12, the torque tube 26 is rotated in the direction indicated by arrow A, thereby stressing the cable around the torque tube, the force applied to the torque tube being translated through lever arms 38 as previously indicated to the center line 54 to be weighed at a load cell 20 shown in FIG. 1. Due to the ball and seat retention assembly 58 provided in each of the weighbridge/animal crate 12 and main frame 14, the cable 40 precisely aligns itself without producing any external side forces, thereby providing accurate sensitive measurements.

As previously indicated, the ball and seat retention assembly 58 is inserted within keyhole 46 of the upper main frame 14 and weighbridge/animal crate 12.

FIG. 9 is a more detailed view of the ball and seat retention assembly 58 described in connection with the present invention and as utilized at the center line 54 of the load cell 20 shown in FIG. 1 and FIG. 2. In particular, there is shown a ball seat 64, and ball members 66 which is swedged onto the strand core cable 40 as shown. A threaded plug 68 is utilized as the base portion which is extended in FIG. 2 up to the load cell 20 as shown in FIG. 1.

FIG. 10 shows a similar arrangement including the ball seats 64 and swedged balls 66 in connection with the core strand cable 40, this arrangement having the ball member at each end of the cable being utilized in connection with FIG. 7 wherein the cable 40 is wrapped around the cylindrical torque member 26. An additional silver soldered area may be applied to the bent portion of weigh cable 40 in order to retain the shape of the cable as it is wrapped around the shank of bolt 60 above the washer 62 (see FIG. 7).

With the ball and seat retention assembly 58 of the present invention in which a ball 66 and ball seat 64 combination is fitted into a separate flanged seat on each end of a weigh cable, greater stability and anchoring properties are provided. The ball seat 64, as previously indicated is mated with a corresponding key hole slot 46 along the periphery of a suspended weighbridge/animal crate 12 as more clearly shown in FIG. 2. The other end of the cable 40, having a second ball and seat retention assembly 58 is positioned in convolutions along the outer surface of the cylindrical torque member 26, and ultimately connected to the mainframe 14 of the scale. Thus, the ball and seat retention assembly 58 produces a system which when inserted into keyhole slots 46 will allow the cables 40 to precisely align themselves without producing any external side forces due to the retention assembly. The keyhole slots provide positive lateral positioning of the ball and seat assembly, and eliminate any guessing as to the proper location of the cables and their retention assemblies in a weigh scale.

As more clearly shown in FIG. 1, the cylindrical torque member 26 is positioned along the width of each end of the livestock scale, and requires two cable and seat retention assembly devices fitted within corresponding keyhole slots 46 for each torque tube 26.

It should be understood that the torque suspension weighing scale of the present invention provides unique retention assemblies which substantially increase the sensitivity and practicality of livestock weighing scales or other heavy duty scales requiring a high amount of precision in their measurements.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An apparatus for securely fastening a torque suspension member to a main frame and a weighbridge/animal crate in a torque suspension weighing scale comprising:
   weigh cable means separately surrounding said torque suspension member at a predetermined location thereof;
   a ball member fixed to each exposed end of said weigh cable means;
   a seat retention member axially movable along said weigh cable means and corresponding to each said ball member;
   wherein said ball member fits within said seat retention member to form a ball and seat retention assembly; and
   means for supporting said ball and seat retention assembly with respect to each said weighbridge/animal crate and said main frame when torque is applied to said torque suspension member in response to force applied to said weighbrige/animal crate.

2. The apparatus according to claim 1, wherein said weighbridge/animal crate includes a weighing platform at the base thereof.

3. The apparatus according to claim 1, wherein said torque suspension member is positioned between corresponding opposing lateral ends of each said mainframe and said weighbridge/animal crate at the top of said weighing scale.

4. An apparatus according to claim 1, further including means for transferring torque applied to said torque suspension member to a positive displacement scale.

5. An apparatus according to claim 1, wherein at least two torque suspension members may be provided for a single torque suspension weighing scale.

6. An apparatus according to claim 1, wherein said means for supporting includes at least one keyhole member formed in each of said mainframe and weighbrige/animal crate, and wherein each said ball and seat retention assembly is positioned in a respective keyhole member to provide positive lateral positioning of said ball and seat retention assembly, whereby the torque suspension weighing scale has increased sensitivity without slippage at said means for supporting.

7. A torque suspension weighing scale comprising:
   a main frame;
   a weighbridge/animal crate positioned within and supportable by said main frame;
   a weighing platform integrally formed as a base of said weighbridge/animal crate;
   torque suspension members positioned below a pair of opposing upper lateral edges of said main frame and above a pair of corresponding upper lateral edges of said weighbridge/animal crate;

means for connecting said torque suspension members to both said main frame and said weighbridge/animal crate;

a positive displacement scale;

means for connecting said torque suspension members to said positive displacement scale, said means for connecting including lever arms fixed to first opposing ends of parallel torque suspension members, a keyhole slot formed in the free ends of adjacent lever arms, a cable aligning said lever arms in an upper and lower relationship, and a ball and seat retention assembly surrounding said cable at a lower side of each said upper and lower lever arms, said ball and seat retention assembly being fitted into respective ones of said keyhole slots to provide positive lateral positioning of said ball and retention assembly with respect to said lever arms; and means for transmitting torque applied to said torque suspension members to said positive displacement scale.

8. The torque suspension weighing scale according to claim 7, wherein said means for connecting said torque suspension members to both said weighbridge/animal crate and said main frame include a weigh cable threaded through convolutions in the outer surface of said torque suspension member, a ball fixed to exposed ends of said weigh cable, a seat retention member slidable along the axial surface of each end of said weigh cable, and a keyhole slot formed in each of said main frame and said weighbridge/animal crate wherein weight applied to said weighbridge/animal crate will force said weighbridge/animal crate downward causing the balls to fit securely within said seat retention member inserted into said keyhole slots.

9. The torque suspension weighing scale according to claim 7, wherein said means for transmitting torque applied to said torque suspension members to said positive displacement scale includes the corresponding rotation of opposing parallel torque suspension members in response to a force being applied to said subframe, said rotation applying a downward force to said levers at said means for connecting to accurately measure a force applied to said weighbridge/animal crate via said torque suspension members.

10. The torque suspension weighing scale according to claim 7, wherein said torque suspension members are parallel opposing elongated tubes of steel having convolutions formed therein at two locations each to receive said weigh cable.

11. The torque suspension weighing scale according to claim 7, wherein said seat retention member includes a narrow shank adaPted to be fitted within said keyhole slot and a bowl-shaped portion formed at one end of the shank to snugly receive said ball.

12. An apparatus for securely fastening a torque suspension member to a weighbridge/animal crate and a main frame in a torque suspension weighing scale comprising:

two weigh cables separately surrounding said torque suspension member at two predetermined locations thereof;

a ball member fixed to each exposed end of said weigh cables;

a plurality of seat retention members axially movable along said weigh cables and corresponding to each said ball member; and a keyhole slot formed in each of said weighbridge/animal crate and said main frame, said keyhole slots corresponding to the predetermined locations of said weigh cables;

wherein said seat retention members are insertable into said respective keyhole slots and said ball members fit within corresponding ones of said seat retention members to provide a positive lateral positioning of said ball and seat retention members with respect to each said weighbridge/animal crate and said main frame when torque is applied to said torque suspension members in response to a force applied to said weighbridge/animal crate.

* * * * *